US009701484B2

(12) United States Patent
Tisserand

(10) Patent No.: US 9,701,484 B2
(45) Date of Patent: Jul. 11, 2017

(54) TELESCOPIC LUBRICATION INJECTOR, NOTABLY FOR GREASE INJECTION SYSTEM OPERATOR

(71) Applicant: Kilian Tisserand, Vivy (FR)

(72) Inventor: Kilian Tisserand, Vivy (FR)

(73) Assignee: SKF LUBRICATION SYSTEMS FRANCE, Rue Robert Amy, Saumur (FR)

(*) Notice: Subject to any disclaimer, the term of this patent is extended or adjusted under 35 U.S.C. 154(b) by 98 days.

(21) Appl. No.: 14/793,811

(22) Filed: Jul. 8, 2015

(65) Prior Publication Data

US 2016/0016737 A1 Jan. 21, 2016

(30) Foreign Application Priority Data

Jul. 9, 2014 (EP) ..................................... 14306119

(51) Int. Cl.
| | | |
|---|---|---|
| F16N 7/16 | (2006.01) | |
| F16N 7/24 | (2006.01) | |
| F16N 13/22 | (2006.01) | |
| F16N 27/00 | (2006.01) | |
| B65G 45/08 | (2006.01) | |
| F16N 13/16 | (2006.01) | |
| F16N 11/00 | (2006.01) | |
| F16N 13/02 | (2006.01) | |

(52) U.S. Cl.
CPC .............. B65G 45/08 (2013.01); F16N 11/00 (2013.01); F16N 13/02 (2013.01); F16N 13/16 (2013.01)

(58) Field of Classification Search
CPC ......... B65G 45/08; F16H 57/05; F16N 13/16; F16N 7/34; F01M 1/08
USPC .................................................. 184/15.2, 7.4
See application file for complete search history.

(56) References Cited

U.S. PATENT DOCUMENTS

| | | | | | |
|---|---|---|---|---|---|
| 1,933,464 | A | * | 10/1933 | West | B65G 45/08 184/15.2 |
| 2,886,134 | A | * | 5/1959 | Simmons | B65G 45/08 184/15.1 |
| 2,893,515 | A | * | 7/1959 | Schweisthal | F16N 25/00 137/628 |
| 2,990,916 | A | * | 7/1961 | Hillard | B60R 17/00 184/15.1 |
| 2,998,865 | A | * | 9/1961 | Geissler | F16H 57/05 184/15.2 |
| 3,073,415 | A | * | 1/1963 | Dutton | B65G 45/08 184/15.2 |
| 3,135,355 | A | * | 6/1964 | Olsen | B65G 45/08 184/15.1 |
| 3,156,320 | A | * | 11/1964 | Bystricky | B65G 45/08 184/15.1 |
| 3,353,630 | A | * | 11/1967 | Woor | B65G 45/08 184/15.1 |
| 3,771,623 | A | * | 11/1973 | Sugawara | B65G 45/08 184/15.2 |
| 3,841,438 | A | * | 10/1974 | Tine | F16N 7/34 116/272 |
| 3,869,023 | A | * | 3/1975 | Thomson | B65G 45/08 184/15.2 |
| 3,955,647 | A | * | 5/1976 | Tine | F01M 1/08 184/39.1 |
| 3,967,698 | A | * | 7/1976 | Smith | B27B 17/12 184/15.2 |

(Continued)

FOREIGN PATENT DOCUMENTS

GB 919107 A 2/1963

*Primary Examiner* — Henry Liu
(74) *Attorney, Agent, or Firm* — Bryan Peckjian; SKF USA Inc. Patent Dept.

(57) ABSTRACT

A lubrication injector comprising a housing and a translating metering body axially moveable with respect to the housing and provided with a lubricant supply channel. The injector includes at least one translating intermediate piston radially interposed between the metering body and the housing and axially moveable with respect to the housing, the intermediate piston carrying the metering body. The intermediate piston is mounted slidable axially on the metering body. The intermediate piston and the metering body delimit at least partly a metering chamber for a lubricant in communication with the supply channel of the metering body.

17 Claims, 3 Drawing Sheets

(56) References Cited

U.S. PATENT DOCUMENTS

| | | | | |
|---|---|---|---|---|
| 4,679,659 A * | 7/1987 | Jendick | F16N 13/22 |
| | | | 184/15.2 |
| 4,745,990 A * | 5/1988 | Saretzky | F16N 13/16 |
| | | | 184/15.2 |
| 4,893,697 A * | 1/1990 | Tosi | F16N 13/16 |
| | | | 184/29 |
| 5,067,591 A * | 11/1991 | Fehlig | F16N 5/02 |
| | | | 141/21 |
| 5,253,984 A * | 10/1993 | Gruett | B05B 12/06 |
| | | | 184/15.2 |
| 5,524,729 A * | 6/1996 | Boelkins | F16N 13/16 |
| | | | 184/39.1 |
| 5,638,920 A * | 6/1997 | Gruett | F16N 7/34 |
| | | | 184/39.1 |
| 5,647,456 A * | 7/1997 | Gelb | B62J 31/00 |
| | | | 184/15.2 |
| 6,071,097 A * | 6/2000 | Gruett | F04B 53/121 |
| | | | 184/55.2 |
| 6,099,270 A * | 8/2000 | Wech | F04B 53/1022 |
| | | | 184/55.2 |

* cited by examiner

TELESCOPIC LUBRICATION INJECTOR, NOTABLY FOR GREASE INJECTION SYSTEM OPERATOR

CROSS REFERENCE TO RELATED APPLICATIONS

This is a Non-Provisional Patent Application, filed under the Paris Convention, claiming the benefit of Europe Patent (EP) Application Number 14306119.0, filed on 9 Jul. 2014 (9 Jul. 2014), which is incorporated herein by reference in its entirety.

FIELD OF THE INVENTION

The present invention relates to the fields of lubrication injectors, notably those used in grease injection systems for chain conveyors.

BACKGROUND OF THE INVENTION

Chain conveyors are used in a variety of industries to move articles and require lubrication for the plates, the rollers and all the moving parts of the chain to prevent the wear.

Most grease injection systems for such conveyor are provided with a lubrication injector comprising a housing, a metering body disposed into the housing and a dispensing head mounted onto the body, and with a pneumatic cylinder disposed axially behind the lubrication injector. The pneumatic cylinder comprises a piston rod connected to the housing of the lubrication injector. In use, while the pneumatic cylinder runs its stroke, the dispensing head first approaches a lubrication inlet of the chain conveyor and comes into contact with the inlet, and then delivers the grease into. The delivery of grease is obtained with a sliding of the housing on the metering body under the action of the pneumatic cylinder.

Such current design leads to a large required space for the grease injection system. However, the available space around the chain for installing such system is always very small.

One aim of the present invention is to overcome this drawback.

SUMMARY OF THE INVENTION

It is a particular object of the present invention to provide a lubrication injector, notably for grease injection system, having a good compactness in the axial direction.

In one embodiment, the lubrication injector comprises a housing, a translating metering body axially moveable with respect to the housing and provided with a lubricant supply channel, and at least one translating intermediate piston radially interposed between the metering body and the housing and axially moveable with respect to the housing. The intermediate piston carries the metering body. The intermediate piston is mounted slidable axially on the metering body. The intermediate piston and the metering body delimit at least partly a metering chamber for a lubricant in communication with the supply channel of the metering body.

The intermediate piston is able to axially drive the metering body relative to the housing and is also able to axially slide on the metering body in order to reduce the volume of the metering chamber. The axial compactness of the injector is limited since the piston actuating the metering body is disposed inside the housing and radially surrounds the body. The total length of the injector is reduced with the nesting piston and body. The piston and the body form a telescopic cylinder mounted into the housing.

Preferably, the housing delimits together with the intermediate piston a first chamber and an opposite second chamber for an actuating fluid.

In one embodiment, the intermediate piston comprises passage means for the lubricant in communication with the metering chamber. The passage means may comprise at least one hole made in the thickness of the intermediate piston and opening into the metering chamber. Advantageously, the housing may comprise passage means for the lubricant in communication with the passage means of the intermediate piston. The passage means of the housing may comprise at least one hole made in the thickness of the housing.

In one embodiment, the lubrication injector further comprises means for setting a stroke of the intermediate piston relative to the metering body which are mounted on the intermediate piston. The setting means delimit together with the piston and the metering body the metering chamber. The axial position of the setting means relative to the intermediate piston is adjustable. Preferably, the setting means are screwed into a bore of the intermediate piston.

In one embodiment, the injector comprises a dispensing head mounted on the metering body and comprising an outlet orifice in communication with the supply channel of the metering body, the intermediate piston being mounted slidable axially on the metering body towards the dispensing head in order to reduce the volume of the metering chamber.

The lubrication injector may further comprise at least one elastic actuator axially disposed between the metering body and the intermediate piston to obtain a compression of the actuator during an axial movement of the intermediate piston on the metering body towards the dispensing head. Preferably, the metering body and the intermediate piston delimit together a space inside which is disposed the elastic actuator. In one embodiment, the elastic actuator comprises one compression spring.

In one embodiment, the housing is provided with a main tubular body comprising a bore into which is mounted the intermediate piston, and with two side plates fixed onto the body.

Preferably, the intermediate piston comprises a bore into which is mounted the metering body, the bore partly delimiting the metering chamber.

The invention also concerns a grease injection system for chain conveyor comprising at least one lubrication injector as previously defined.

BRIEF DESCRIPTION OF THE FIGURES

The present invention and its advantages will be better understood by studying the detailed description of a specific embodiment given by way of a non-limiting example and illustrated by the appended drawings on which.

DETAILED DESCRIPTION OF THE EMBODIMENTS

Figure 1:
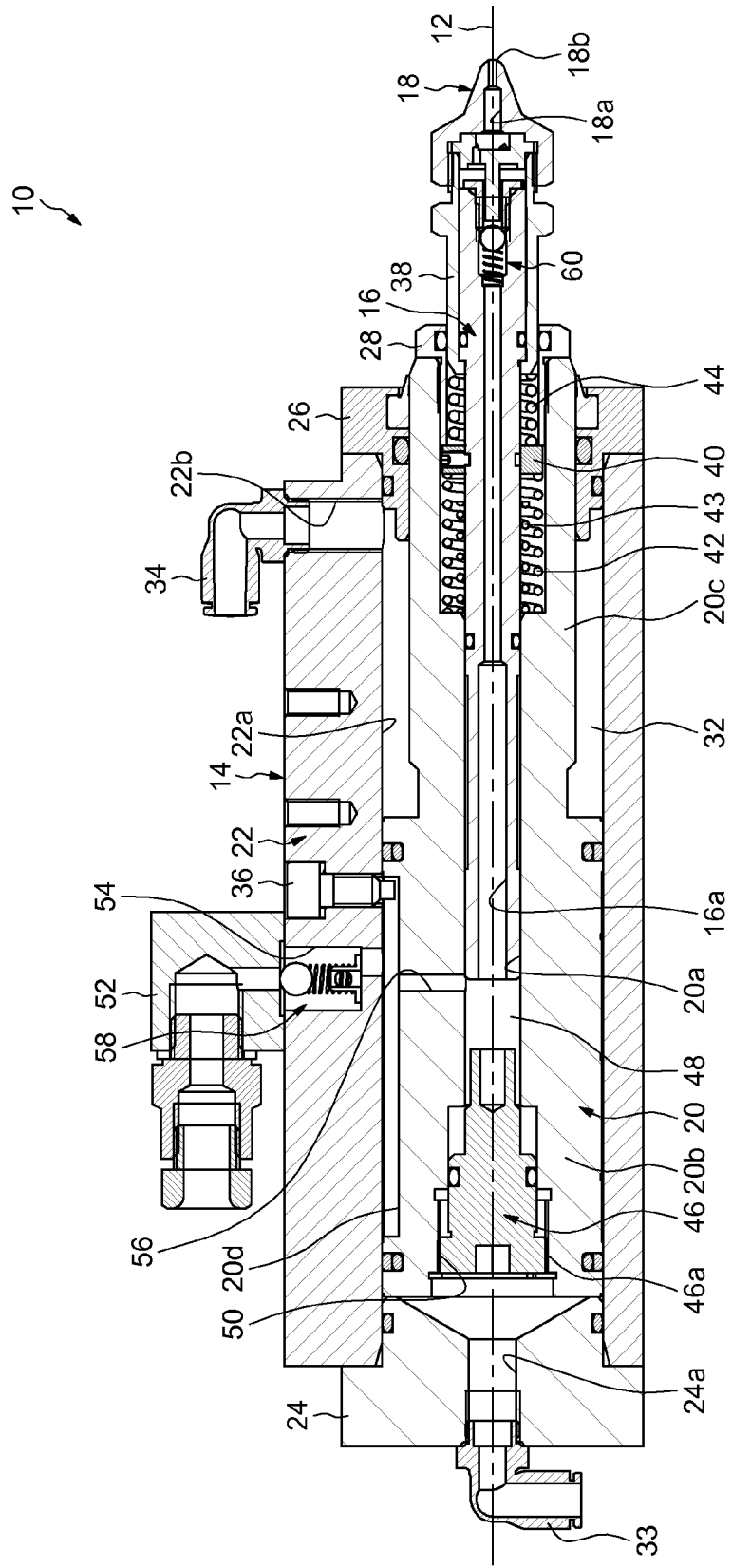
FIGS. 1, 2, and 3 are cross-sections of a lubrication injector according to an example of the invention.

A lubrication injector 10 as shown on FIG. 1 is particularly adapted for a lubricant injection system for chain conveyor. However, the injector 10 can also be used in other applications that require a limited compactness in the axial direction.

The injector 10, with an axis 12, comprises a housing 14, a metering piston or body 16 mounted into the housing, a dispensing head 18 disposed on the metering body and adapted to spray the lubricant, and an intermediate piston 20 radially interposed between the metering body and the housing. The piston 20 supports the metering body and is axially movable with respect to the housing 14 along the axis 12. The metering body 16 and the intermediate piston 20 each have a cylindrical form.

The housing 14 is provided with a tubular main body 22 and with first and second side plates 24, 26 each fixed to one end of the body. The body 22 comprises an axial annular bore 22a, coaxial with the axis 12, into which is mounted the intermediate piston 20. The piston 20 is mounted in radial contact with the bore 22a.

The intermediate piston 20 extends longitudinally along the axis 12 and through the bore 22a of the housing. The piston 20 comprises an annular bore 20a, coaxial with the axis 12, into which is mounted the metering body 16. The body 16 is mounted in radial contact with the bore 20a. The bore 20a extends on the entire axial length of the piston 20. The bore 20a extends axially from a frontal rear face of the piston to an opposite frontal front face. In the illustrated example, the bore 20a has a stepped form.

The intermediate piston 20 comprises a cylinder portion 20b mounted in radial contact with the bore 22a of the nut, and a rod portion 20c extending axially from a front face of the cylinder portion and having a reduced diameter. In the position shown on FIG. 1, a rear face of the cylinder portion 20b, which forms the rear face of the piston, axially comes into contact with the side plate 24. A sleeve 28 is secured into the bore 20a of the piston and axially bears against the end of the rod portion 20c axially located on the side of the dispensing head 18.

Figure 2:
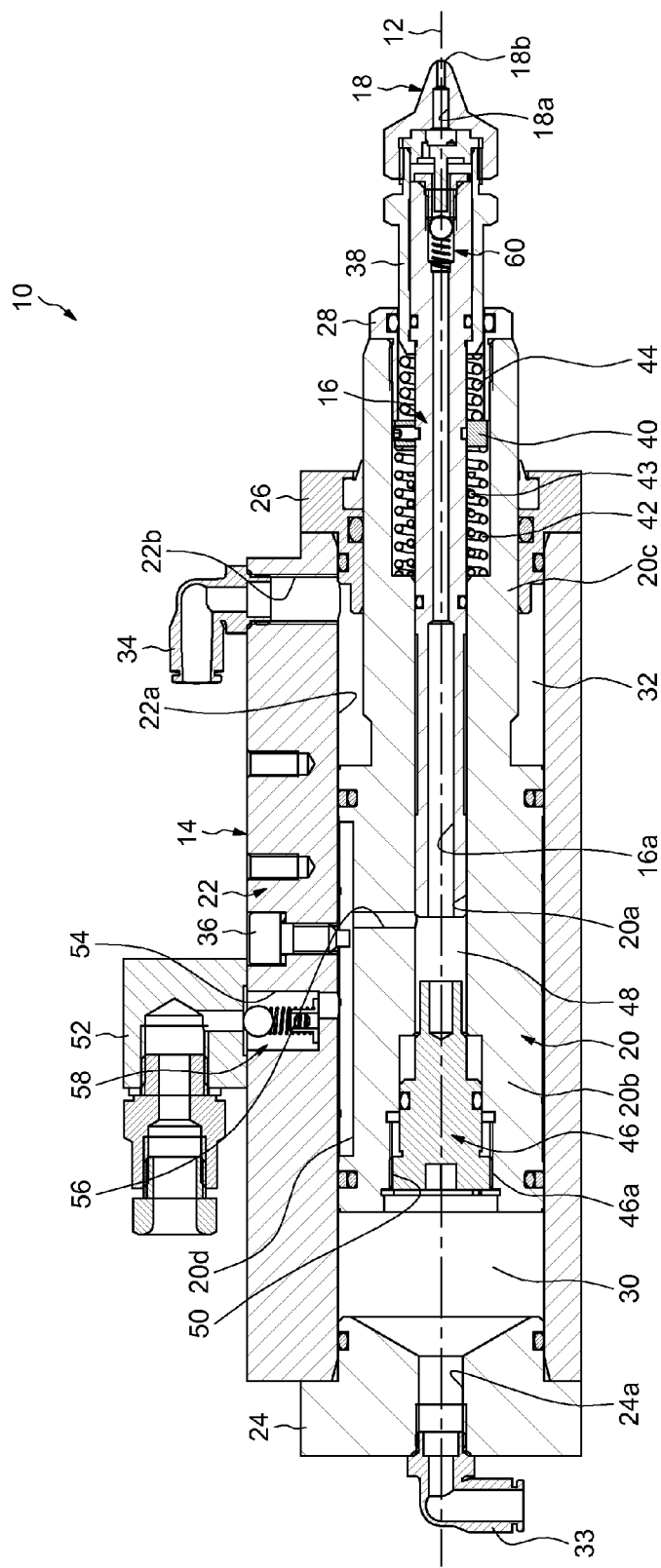
Figure 3:
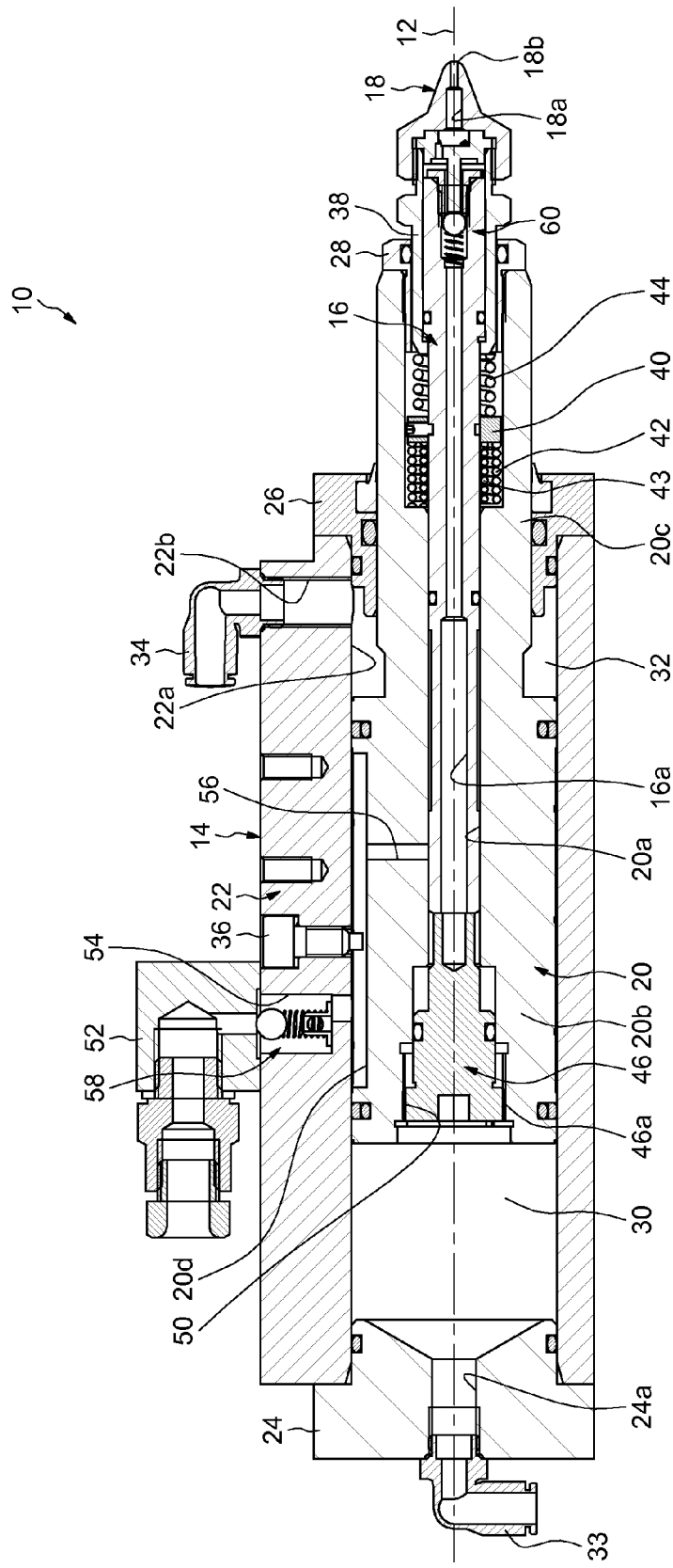

The side plate 24 and the bore 22a of the housing delimit together with the intermediate piston 20 a first chamber 30 (FIGS. 2 and 3). The opposite side plate 26, the bore 22a and the piston 20 delimit a second chamber 32 axially opposite to the first chamber with regard to the cylinder portion 20b of the piston. As will be described later, the piston 20 may be actuated by an external source of energy (not shown), for example a pneumatic source, in order to axially move with respect to the housing 14. To this end, the side plate 24 comprises a through-hole 24a extending axially into its thickness and opening into the chamber 30. A through-hole 22b is also provided into the thickness the body 22 and opens into the chamber 32. The hole 22b extends radially. Fittings 33, 34 are respectively mounted into the through-holes 24a, 22b to be connected to the external source.

In the illustrated example, the intermediate piston 20 comprises a longitudinal groove 20d provided on the outer surface of the cylinder portion 20b and into which extends a screw 36 mounted on the body 22 of the housing. The groove 20d and the screw 36 form guiding means of the piston 20.

The metering body 16 has a tubular shape and extends along the axis 12. The body 16 axially protrudes outwards with respect to the piston 20 and the housing 14. The body 16 comprises a supply channel 16a extending axially from a frontal rear face of the body to an opposite frontal front face. The supply channel 16a is coaxial with the axis 12.

The dispensing head 18 comprises a delivery channel 18a which communicates with the supply channel 16a of the metering body and which emerges at an outlet orifice 18b. In the illustrated example, the injector 10 also comprises an annular sleeve 38 mounted on the outer surface of the metering body 16 and supporting the dispensing head 18. The sleeve 38 is axially moveable on the body 16.

The metering body 16 comprises an abutment ring 40 secured to its outer surface and radially disposed into the bore 20a of the intermediate piston without contact with the bore. The ring 40 forms on the body 16 a protrusion extending radially outwards. Alternatively, the body 16 and the ring 40 may be made in one part. The sleeve 28 of the intermediate piston axially bears against the abutment ring 40 in the position shown on FIG. 1.

The injector 10 also comprises first elastic return springs 42, 43 axially disposed between the abutment ring 40 and the intermediate piston 20. Each spring 42, 43 is disposed inside a closed space delimited by the bore of piston 20 and the metering body 16. A first end of each spring 42, 43 axially bears against the piston 20 and a second opposite end axially bears against the ring 40. Each spring 42, 43 is coaxial with the axis 12. In the illustrated example, each spring 42, 43 is a compression spring.

The injector 10 further comprises a second elastic return spring 44 axially disposed on the side opposite to the return spring 42, 43 with regard to the abutment ring 40. The spring 44 is axially disposed between the ring 40 and the sleeve 38 of the metering body 16. The spring 44 is disposed inside the bore of the sleeve 28 of the piston. A first end of the spring 44 axially bears against the sleeve 38 and a second opposite end axially bears against the ring 40. The spring 44 is coaxial with the axis 12. In the illustrated example, the spring 44 is a compression spring.

The injector 10 further comprises a plug 46 mounted into the bore 20a of the intermediate piston axially on the side opposite to the dispensing head 18 with respect to the metering body 16. In the position shown on FIG. 1, the plug 46 is axially spaced apart from the metering body 16. The plug 46 and the body 16 delimit into the bore 20a an interior tight metering chamber 48 for a lubricant to deliver (not shown). The lubricant may be grease or oil. The chamber 48 is delimited axially by the frontal rear face of the body 16 and a frontal front face of the plug 46. The axial position of the plug 46 into the bore 20a of the piston is axially adjustable for setting a stroke of the piston relative to the metering body 16. The plug 46 comprises an outer thread 46a provided on its outer surface and which engages with an inner thread 50 formed on the bore 20a of the piston. The plug 46 is screwed into the bore 20a and is coaxial to the axis 12.

The plug 46 and the bore 20a of the piston demit together with the body 16 the metering chamber 48. The chamber 48 is in communication with the supply channel 16a of the metering body. The chamber 48 is located at the entrance of the supply channel 16a. Passage means are provided for the lubricant to pass from an external circuit (not shown) to the metering chamber 48 in order to fill the chamber and the supply channel 16a of the metering body. The circuit for the delivery of the lubricant may comprise a circulation pump and is connected to a fitting 52 mounted on the outer surface of the housing 14.

In the illustrated example, these passage means are of several type. Firstly, there is a radial through-hole 54 made in the thickness of the housing 14. The hole 54 extends from the outer surface of the body 22 of the housing and opens into the bore 22a. Secondly, other passage means for the introduction of the lubricant inside the metering chamber 48 consist in a radial through-hole 56 made in the thickness of the piston 20. The hole 56 extends from the outer surface of the piston 20 and opens into the metering chamber 48. The hole 56 communicates with the hole 54 of the housing.

The housing 14 further comprises opening and closing means 58 adapted to close off the hole 54 when no lubricant is delivered by the circulation pump and to open the hole when the lubricant is delivered. In the disclosed embodiment, the opening and closing means 58 comprises a ball and a spring applying a permanent radial force on the ball to urge it against a supply conduit of the fitting 52.

The injector 10 also comprises opening and closing means 60 adapted to close off the supply channel 16a of the metering body. Under the effect of the pressure applied by the lubricant inside the channel 16a, the channel is closed. In the disclosed embodiment, the opening and closing means 60 are mounted into the supply channel 16a of the body and comprises a ball and a spring applying a permanent axial force on the ball to urge the ball against a plug of the dispensing head.

In use, from the position shown on FIG. 1, the piston 20 is actuated by the external source of energy which conveys a fluid into the hole 24a and the chamber 30 of the housing. With the effect of the pressure applied by the fluid on the rear face of the piston 20, the piston moves axially jointly with the metering body 16 towards the outside. The piston 20 and the metering body 16 moves axially together until the dispensing head 18 comes into contact with a lubrication inlet of the chain conveyor (not shown) to lubricate. During this first approach step, the piston 20 axially drives the metering body 16 as shown on FIG. 2. There is no axial relative movement between the body 16 and the piston 20.

With the contact between the dispensing head 16 of the injector and the chain conveyor, the collar 38 supporting the head axially moves on the metering body 16 towards the piston 20 since the fluid still exerts a pressure on the rear face of the piston and some lubricant already fills the supply channel 16a of the metering body. The spring 44 is axially compressed between the ring 40 of the body and the collar 38. The means 60 opens the supply channel 16a of the metering body.

Then, the piston 20 axially slides on the metering body 16 towards the head 18 under the pressure applied on the piston. The piston 20 axially translates with respect to the body 16 until the plug 46 axially abuts against the body as shown on FIG. 3. The front face of the plug axially comes into contact against the rear face of the body 18. The elastic springs 42, 43 are axially compressed between the ring 40 and piston 20.

During the axial movement of the piston 20 on the body 16, the volume of the metering chamber 48 is reduced. The plug 46 of the piston exerts an axial pressure on the lubricant located into the chamber 48 which is conveyed inside the supply channel 16a of the metering body. This leads to a dispersing of the lubricant already present into the supply channel.

Then, the external source of energy conveys the fluid into the chamber 32 of the housing and not anymore into the chamber 30. With the effect of the pressure applied by the fluid on the front face of the cylinder portion 20b of the piston, the piston moves axially jointly with the metering body 16 towards the inside of the housing 14. Simultaneously, since the dispensing head 18 is not anymore in contact with the chain conveyor, the spring 44 releases the stored energy during the compression and exerts an axial force on the sleeve 38 which axially slides on the metering body 16 towards the outside. The means 60 close the supply channel 16a of the metering body with such translation. The springs 42, 43 also release the stored energy and exert an axial force on the ring 40 of the metering body. The body 16 axially slides into the bore 20a of the piston towards the outside. Thus, the rear face of the metering body 16 is axially spaced apart from the plug 46 of the piston and the metering chamber 48 recovers its initial volume. The external source of energy is then stopped when the piston 20 abuts against the side plate 24 as shown in the position illustrated on FIG. 1.

The disposition of an intermediate piston mounted inside the housing of the injector and the mounting of the metering body into the piston enable to limit the axial compactness of the injector. The total length of the injector is limited with the piston and the metering body which are axially nested into the housing. Otherwise, with the structure as illustrated in the example shown on the Figures, the injector is easily adaptable to the configuration of the chain conveyor. A first type of chain conveyor is called "chain conveyor moving to the right" and a second type is called "chain conveyor moving to the left". The mounting of each plate either on one side or on the other side of the housing is chosen according to the type of the associated chain conveyor.

Although the invention has been illustrated on the basis of a lubrication injector having a plug which is axially movable along the intermediate piston in order to set the stroke of the piston, it should be understood that the invention can be applied with a plug having another design or with a piston deprived of such movable plug.

What is claimed is:

1. A lubrication injector comprising:
   a housing;
   a translating metering body provided with a lubricant supply channel,
   a dispensing head, the dispensing head axially fixed to an exposed end of the metering body;
   at least one translating intermediate piston radially interposed between the metering body and the housing and axially moveable with respect to the housing, the intermediate piston carrying the metering body and being mounted slidable axially on the metering body; and
   an annular bore formed through the at least one translating intermediate piston;
   the metering body axially moveable within the annular bore, wherein mating surfaces of the metering body and the annular bore form a seal,
   the annular bore of the intermediate piston, the metering body, and the seal formed therebetween delimiting at least partly a metering chamber for a lubricant in communication with the supply channel of the metering body.

2. The lubrication injector according to claim 1, wherein the housing delimits together with the intermediate piston a first chamber and an opposite second chamber for an actuating fluid.

3. The lubrication injector according to claim 1, the intermediate piston further comprising a passage for the lubricant, wherein the passage is in fluid communication with the metering chamber.

4. The lubrication injector according to claim 3, the passage further comprising at least one hole made in a thickness of the intermediate piston and opening into the metering chamber.

5. The lubrication injector according to claim 3, the housing further comprising a passage for the lubricant in communication with the passage of the intermediate piston.

6. The lubrication injector according to claim 5, the passage of the housing further comprising at least one hole made in its thickness.

7. The lubrication injector according to claim 1, further comprising a feature for setting a stroke of the intermediate piston relative to the metering body which are mounted on the intermediate piston and which delimit together with the piston and the metering body the metering chamber, the axial position of the setting feature relative to the intermediate piston being adjustable.

8. The lubrication injector according to claim 7, wherein the setting feature is screwed into a bore of the intermediate piston.

9. The lubrication injector according to claim 1, the dispensing head further comprising an outlet orifice in communication with the supply channel of the metering body,
the intermediate piston being mounted slidable axially on the metering body towards the dispensing head in order to reduce the volume of the metering chamber.

10. The lubrication injector according to claim 1, further comprising at least one elastic actuator axially disposed between the metering body and the intermediate piston to obtain a compression of the actuator during an axial movement of the intermediate piston on the metering body in one direction.

11. The lubrication injector according to claim 10, wherein the metering body and the intermediate piston delimit together a space inside which is disposed the elastic actuator.

12. The lubrication injector according to claim 10, the elastic actuator further comprising one compression spring.

13. The lubrication injector according to claim 1, wherein the housing is provided with a main tubular body comprising a bore into which is mounted the intermediate piston, and with two side plates fixed onto the body.

14. The lubrication injector according to claim 1, wherein the intermediate piston comprises a bore into which is mounted the metering body.

15. A grease injection system for a chain conveyor, the grease injection system comprising at least one lubrication injector, the lubrication injector comprising:
a housing;
a translating metering body provided with a lubricant supply channel,
a dispensing head, the dispensing head axially fixed to an exposed end of the metering body;
at least one translating intermediate piston radially interposed between the metering body and the housing and axially moveable with respect to the housing, the intermediate piston carrying the metering body and being mounted slidable axially on the metering body; and
an annular bore formed through the at least one translating intermediate piston;
the metering body axially moveable within the annular bore, wherein mating surfaces of the metering body and the annular bore form a seal,
the annular bore of the intermediate piston, the metering body, and the seal formed therebetween delimiting at least partly a metering chamber for a lubricant in communication with the supply channel of the metering body,
wherein the at least one lubrication injector is integrated into the chain conveyor.

16. The lubrication injector according to claim 1, wherein the mating surfaces of the metering body and the annular bore additionally functions to open and seal the lubricant supply channel based upon an axial relationship between the metering body and the annular bore.

17. The lubrication injector according to claim 15, wherein the mating surfaces of the metering body and the annular bore additionally functions to open and seal the lubricant supply channel based upon an axial relationship between the metering body and the annular bore.

* * * * *